(12) United States Patent
Liu et al.

(10) Patent No.: US 11,832,127 B2
(45) Date of Patent: Nov. 28, 2023

(54) HARDWARE-FRIENDLY HARQ OPERATIONS IN WLAN

(71) Applicant: MediaTek Singapore Pte. Ltd., Singapore (SG)

(72) Inventors: Jianhan Liu, San Jose, CA (US); Kai Ying Lu, San Jose, CA (US); Yongho Seok, San Jose, CA (US); Thomas Edward Pare, Jr., San Jose, CA (US); Yungping Hsu, Hsinchu (TW)

(73) Assignee: MediaTek Singapore Pte. Ltd., Singapore (SG)

(*) Notice: Subject to any disclaimer, the term of this patent is extended or adjusted under 35 U.S.C. 154(b) by 65 days.

(21) Appl. No.: 16/918,172

(22) Filed: Jul. 1, 2020

(65) Prior Publication Data

US 2021/0007007 A1 Jan. 7, 2021

Related U.S. Application Data

(60) Provisional application No. 62/870,714, filed on Jul. 4, 2019.

(51) Int. Cl.
*H04W 28/04* (2009.01)
*H04L 1/1829* (2023.01)
*H04L 1/1867* (2023.01)
*H04W 84/12* (2009.01)

(52) U.S. Cl.
CPC .......... *H04W 28/04* (2013.01); *H04L 1/1864* (2013.01); *H04L 1/1896* (2013.01); *H04W 84/12* (2013.01)

(58) Field of Classification Search
CPC .................................................... H04W 28/04
See application file for complete search history.

(56) References Cited

U.S. PATENT DOCUMENTS

| 2008/0165670 | A1 | 7/2008 | Tao et al. |
| 2013/0028189 | A1 | 1/2013 | Bourlas |
| 2016/0182205 | A1 | 6/2016 | Asterjadhi et al. |
| 2016/0183241 | A1* | 6/2016 | Lee ................... H04W 56/0015 |
| | | | 455/425 |
| 2016/0302229 | A1 | 10/2016 | Hedayat |
| 2017/0201348 | A1* | 7/2017 | Jang ...................... H04L 1/0068 |

(Continued)

FOREIGN PATENT DOCUMENTS

| CN | 101572597 A | 11/2009 |
| CN | 105191199 A | 12/2015 |

(Continued)

OTHER PUBLICATIONS

Taiwan Intellectual Property Office, Office Action for Taiwan Patent Application No. 109122497, dated Oct. 30, 2020.

(Continued)

*Primary Examiner* — Jason E Mattis
(74) *Attorney, Agent, or Firm* — Han IP PLLC; Andy M. Han

(57) ABSTRACT

A first apparatus generates a first hybrid automatic repeat request (HARQ) packet and a second HARQ packet based at least in part on one or more capabilities of a second apparatus. The first apparatus sequentially transmits the first HARQ packet and the second HARQ packet to the second apparatus. In response, the first apparatus receives a delayed acknowledgement form the second apparatus after transmitting the second HARQ packet.

19 Claims, 11 Drawing Sheets

300

(A)

| HARQ Type | 1 | 2 | 3 | 4 |
|---|---|---|---|---|
| HARQ Incremental Amount | 20% of CW | 40% of CW | 60% of CW | 80% of CW |

(B)

| HARQ Padding and Extension Type | 1 | 2 | 3 | 4 |
|---|---|---|---|---|
| HARQ Padding and Extension Length | 0μs | 4μs | 8μs | 16μs |

(56) References Cited

U.S. PATENT DOCUMENTS

| | | | |
|---|---|---|---|
| 2017/0230149 A1* | 8/2017 | Wang | H04L 1/1819 |
| 2018/0302825 A1 | 10/2018 | Trainin et al. | |
| 2020/0052832 A1* | 2/2020 | Tian | H04L 1/1845 |
| 2020/0083983 A1* | 3/2020 | Chen | H04L 1/0068 |
| 2021/0006361 A1* | 1/2021 | Asterjadhi | H04W 74/0816 |

FOREIGN PATENT DOCUMENTS

| | | |
|---|---|---|
| TW | 200524331 A | 7/2005 |
| WO | WO 2015006640 A1 | 1/2015 |
| WO | WO 2017143350 A1 | 8/2017 |
| WO | WO 2018031777 A1 | 2/2018 |

OTHER PUBLICATIONS

European Patent Office, Communication regarding European Patent Application No. 20183907.3, dated Nov. 24, 2020.
China National Intellectual Property Administration, First Office Action in China Patent Application No. 202010634184.2, dated Feb. 23, 2023.

* cited by examiner

| HARQ Type | 1 | 2 | 3 | 4 |
|---|---|---|---|---|
| HARQ Incremental Amount | 20% of CW | 40% of CW | 60% of CW | 80% of CW |

(A)

| HARQ Padding and Extension Type | 1 | 2 | 3 | 4 |
|---|---|---|---|---|
| HARQ Padding and Extension Length | 0µs | 4µs | 8µs | 16µs |

| Codeword Bitmap Length | Codeword Acknowledgement Bitmap |
|---|---|
| 2 | 16/32/64/128 |

FIG. 8

HARDWARE-FRIENDLY HARQ OPERATIONS IN WLAN

CROSS REFERENCE TO RELATED PATENT APPLICATION

The present disclosure is part of a non-provisional patent application claiming the priority benefit of U.S. Provisional Patent Application No. 62/870,714, filed on 4 Jul. 2019, the content of which being incorporated by reference in its entirety.

TECHNICAL FIELD

The present disclosure is generally related to wireless communications and, more particularly, to hardware-friendly hybrid automatic repeat request (HARQ) operations in wireless local area networks (WLANs).

BACKGROUND

Unless otherwise indicated herein, approaches described in this section are not prior art to the claims listed below and are not admitted as prior art by inclusion in this section.

For next-generation WLANs based on the upcoming Institute of Electrical and Electronics Engineers (IEEE) 802.11be standard, different HARQ schemes such as chase combining and incremental redundancy (IR) are introduced. Regarding chase combining, a same set of information bits and parity bits are retransmitted, thereby resulting in relatively simple log likelihood ratio (LLR) combining at a receiver. Regarding IR, an original transmission starts with a higher code rate (e.g., with punctured or shortened low-density parity-check (LDPC) code), and retransmission involves transmission of incremental redundancy of different punctured versions of LDPC codes or partial transmission of parity check bits. Accordingly, there are some basic requirements for the receiver. That is, the receiver needs to save LLR values for decoded bits and the receiver also needs to keep Medium Access Control (MAC) Protocol Data Units (MPDUs) in error in a buffer.

However, retransmission with IR would require a higher processing speed (than without) at the receiver. Consequently, significant amount of speed increase of LDPC processing would require an increase in hardware cost. Moreover, as the MAC layer of the receiver would need to process part of Aggregate MPDU (A-MPDU) based on the initial HARQ transmission, the receiver would need to store parts of the A-MPDU decoded from the initial HARQ transmission. This would require additional memory capacity or hardware cost on the part of the receiver. Therefore, there is a need for a solution for hardware-friendly HARQ operations in WLANs.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to hardware-friendly HARQ operations in WLANs. Under various proposed schemes in accordance with the present disclosure, the aforementioned issues of increased hardware cost may be avoided or otherwise alleviated.

In one aspect, a method may involve a processor of a first apparatus generating a first HARQ packet based at least in part on one or more capabilities of a second apparatus. The method may also involve the processor transmitting the first HARQ packet to the second apparatus.

In another aspect, a method may involve a processor of a first apparatus transmitting a first HARQ packet to a second apparatus. The method may also involve the processor transmitting a second HARQ packet to the second apparatus after transmitting the first HARQ packet. The method may further involve the processor receiving a delayed acknowledgement from the second apparatus after transmitting the second HARQ packet.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 3 is a diagram of an example scenario of HARQ transmission under the proposed scheme in accordance with the present disclosure.

FIG. 8 is a diagram of an example scenario of HARQ variant BlockAck format under the proposed scheme in accordance with the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to hardware-friendly HARQ operations in WLANs. According to the present disclosure, a number of possible solutions may be implemented separately or jointly. That is, although these possible solutions may be described below separately, two or more of these possible solutions may be implemented in one combination or another.

Figure 1:
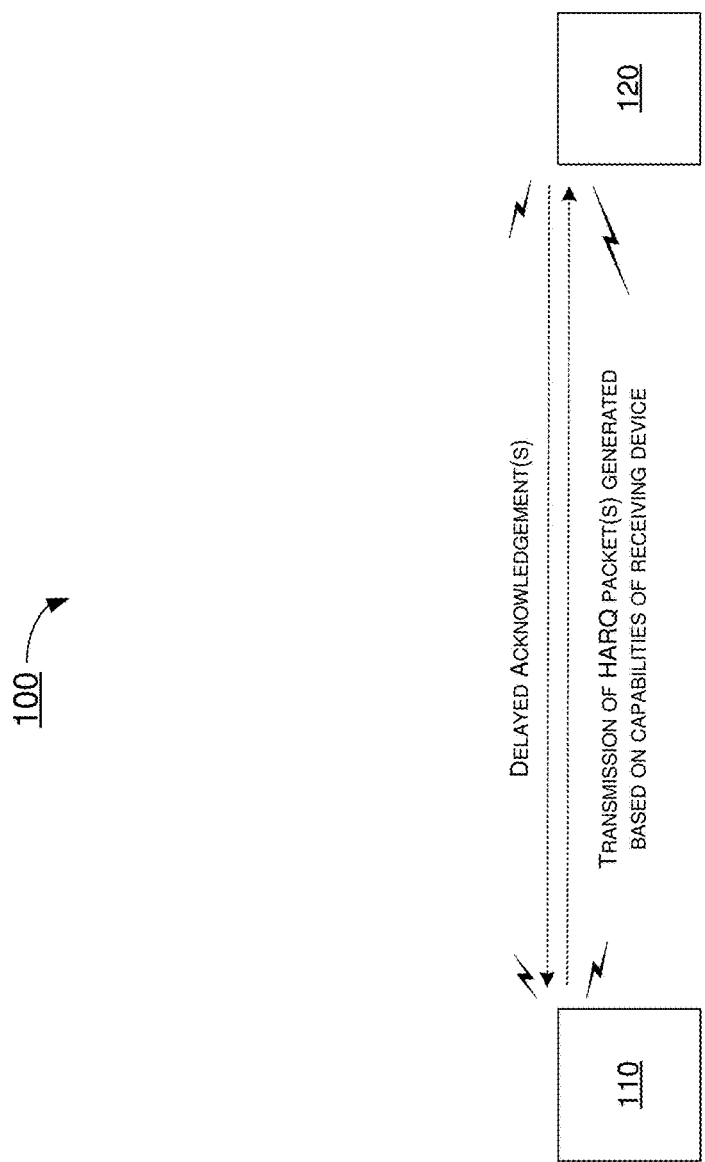
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 8 illustrate examples of implementation of various proposed schemes in network environment 100 in accordance with the present disclosure. The following description of various proposed schemes is provided with reference to FIG. 1~FIG. 8.

Referring to FIG. 1, network environment 100 may involve a communication entity 110 and a communication entity 120 communicating wirelessly in a WLAN in accordance with one or more IEEE 802.11 standards. For instance, communication entity 110 may be a station (STA) or an access point (AP), and communication entity 120 may be a STA or an AP. Under various proposed schemes in accordance with the present disclosure, communication entity 110 and communication entity 120 may be configured to perform hardware-friendly HARQ operations, as described herein. Specifically, communication entity 110 and communication entity 120 may be configured to perform HARQ transmissions based on MAC layer and physical layer (PHY) capabilities. Moreover, communication entity 110 and communication entity 120 may be configured to perform delayed HARQ acknowledgements.

At the PHY layer, one concern is LDPC codeword processing speed for HARQ. Retransmission with IR would require a higher processing speed (than without) at a receiving device (e.g., communication entity 110 or communication entity 120). For example, in an event that HARQ retransmission involves 20% of the code bits, then within one codeword duration there would be IRs for 5 codewords that need to be decoded at the receiving device in case the same latency is expected. For instance, where there are codewords #i, #j, #k, #m and #n, IR bits for codeword #i, #j, #k, #m and #n need to be combined with corresponding codeword within one LDPC codeword duration. In such case, it would require five-time increase in LDPC codeword processing speed. Consequently, significant amount of speed increase of LDPC processing would require an increase in hardware cost.

At the MAC layer, one concern is MPDU processing. The MAC layer of the receiving device (e.g., communication entity 110 or communication entity 120) would need to process part of the A-MPDU based on the initial HARQ transmission. The MAC may not be able to decode some of the MPDU delimiters so parsing the A-MPDU from the initial transmission could be challenging. Un-decoded LDPC codeword data may not align with MPDU boundaries. The MAC layer of the receiving device would need to process the initial un-decoded parts of the A-MPDU based on the HARQ retransmission. This may require storage of parts of the A-MPDU decoded from the initial HARQ transmission, thereby requiring additional memory capacity and/or hardware cost on the part of the receiver.

Under a proposed scheme in accordance with the present disclosure, STAs (e.g., communication entity 110 and/or communication entity 120) with different HARQ implementations may have different capabilities for HARQ processing. A transmitter in communication entity 110 and/or communication entity 120 as a STA or AP may, based on knowledge of the MAC and PHY capabilities for HARQ processing of a target (receiving) STA, determine how to transmit a HARQ packet. With respect to a receiver (RX) in the target STA, the RX PHY capabilities for HARQ processing may include, for example and without limitation, decoding speed, available storage, and supported HARQ type(s). As an example, PHY HARQ capabilities may be categorized into a plurality of levels. With respect to a transmitter (TX) in the target STA, the TX HARQ capabilities for HARQ processing may include, for example and without limitation, supported HARQ type(s).

Figure 2:
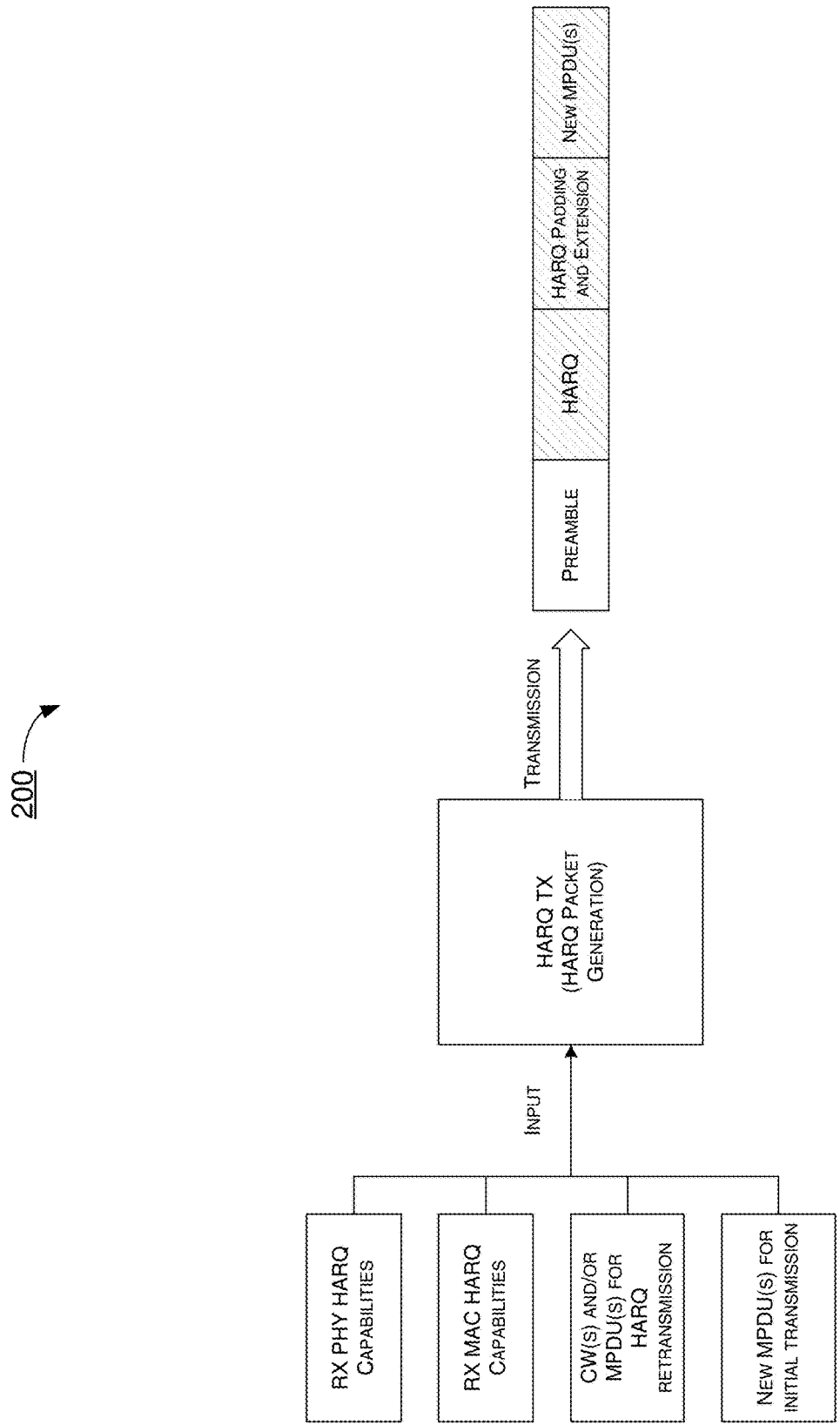
FIG. 2 is a diagram of an example scheme of HARQ transmission under the proposed scheme in accordance with the present disclosure.

FIG. 2 illustrates an example scheme 200 of HARQ transmission under the proposed scheme in accordance with the present disclosure. Under scheme 200, in generating and transmitting a HARQ packet, each of communication entity 110 and communication entity 120, as a transmitting STA or AP, may generate the HARQ packet based on information including RX PHY and MAC capabilities of the target STA as well as codewords (CWs) and/or MPDUs for HARQ transmission and new MPDUs for the target STA. Accordingly, communication entity 110 and communication entity 120, as the transmitting STA or AP, may generate the HARQ packet with corresponding type of HARQ, padding and extension (and, optionally, indication(s) of an allowed acknowledgement mode). Under the proposed scheme, the type of HARQ, padding and extension may be selected to ensure that the target STA can process the HARQ packet within a required time constraint.

FIG. 3 illustrates an example scenario 300 of HARQ transmission under the proposed scheme in accordance with the present disclosure. In scenario 300, the type of HARQ may be an incremental amount or a pattern of punctured LDPC codeword (CW). For instance, as shown in part (A) of FIG. 3, there may be four different types of HARQ retransmission, namely: 20% of CW as type 1, 40% of CW as type 2, 60% of CW as type 3, and 80% of CW as type 4. In actual implementations, the number of types and percentage values of CW may vary. Also, in scenario 300, there may be multiple levels of HARQ padding and extension. For instance, as shown in part (B) of FIG. 3, there may be four different levels of HARQ padding and extension in terms of length of time, namely: 0 μs as level 1, 4 μs as level 2, 8 μs as level 3, and 16 μs as level 4.

Under the proposed scheme, with respect to the selection of type of HARQ and level of HARQ padding and extension, communication entity 110 and communication entity 120, as the transmitting STA or AP, may select the type of HARQ and the level of HARQ padding and extension based on certain factors including, for example and without limitation, HARQ feedbacks and HARQ capabilities of the target STA. The HARQ feedbacks may include, for example and without limitation, a required amount of HARQ retransmission(s) and/or a number of CWs/MPDUs to be retransmitted. Under the proposed scheme, in order to avoid large HARQ padding and extension, the transmitting STA or AP may select the type of HARQ with a relatively larger incremental amount than required by the target STA.

Under another proposed scheme in accordance with the present disclosure, to avoid efficiency degradation caused by HARQ padding and extension, delayed HARQ acknowledgement may be utilized. That is, with delayed acknowledgement for HARQ, a receiving STA or AP (e.g., the target STA) may be provided with more time to process HARQ and, hence, requirements on HARQ processing speed may be reduced.

Figure 4:
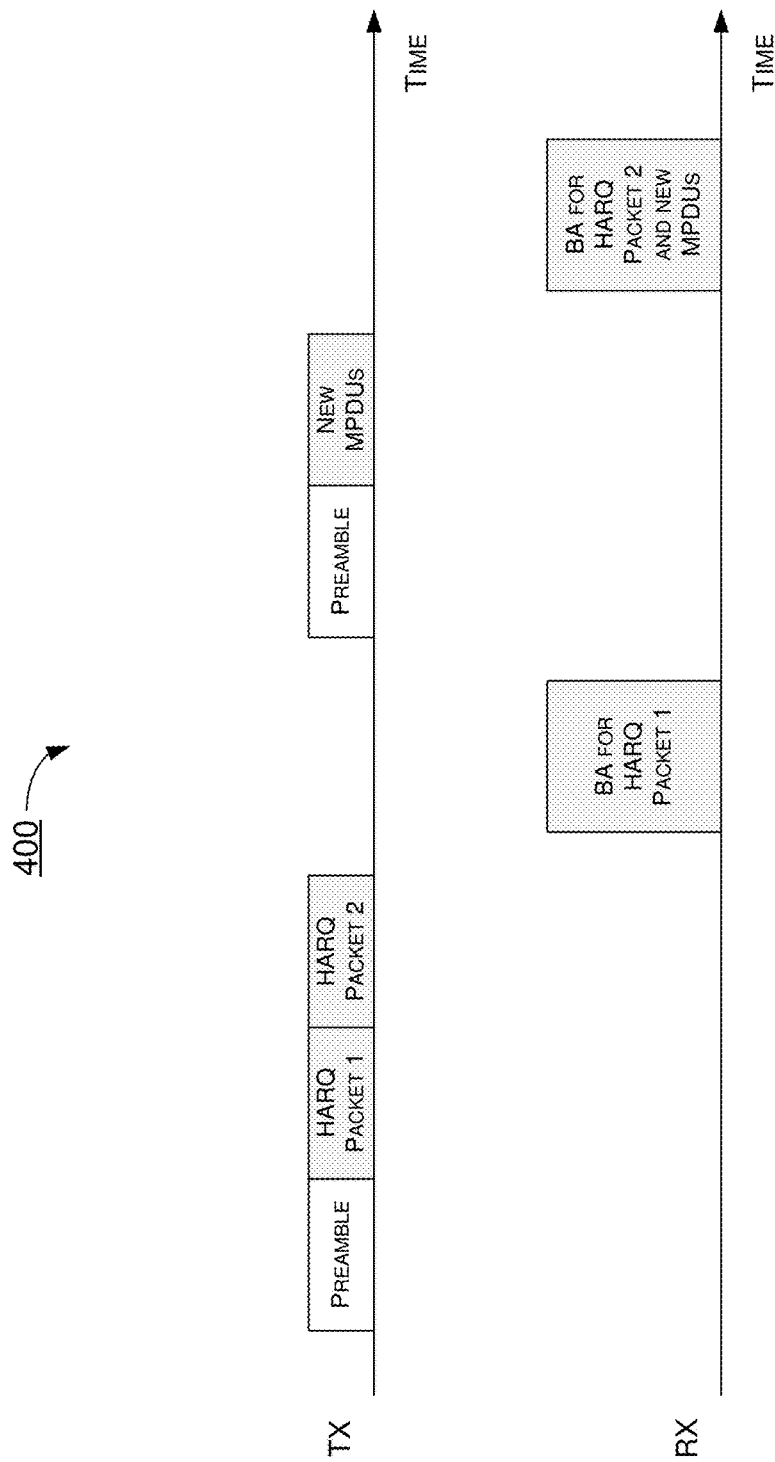
FIG. 4 is a diagram of an example scenario of delayed HARQ acknowledgement under the proposed scheme in accordance with the present disclosure.

FIG. 4 illustrates an example scenario 400 of delayed HARQ acknowledgement under the proposed scheme in accordance with the present disclosure. In scenario 400, communication entity 110 may transmit a preamble, HARQ packet 1 (hereinafter interchangeably referred to as "first HARQ packet") and HARQ packet 2 (hereinafter interchangeably referred to as "second HARQ packet") to communication entity 120. In response, communication entity 120 may transmit a block acknowledgement (BA or BlockAck) for HARQ packet 1 indicating that HARQ packet 1 has been received (and decoded) successfully. Communication entity 110 may then transmit another preamble and one or more new MPDUs to communication entity 120. In response, communication entity 120 may transmit a BA for HARQ packet 2 and the new MDPU(s) indicating that HARQ packet 2 and the new MPDU(s) have been received (and decoded) successfully.

Figure 5:
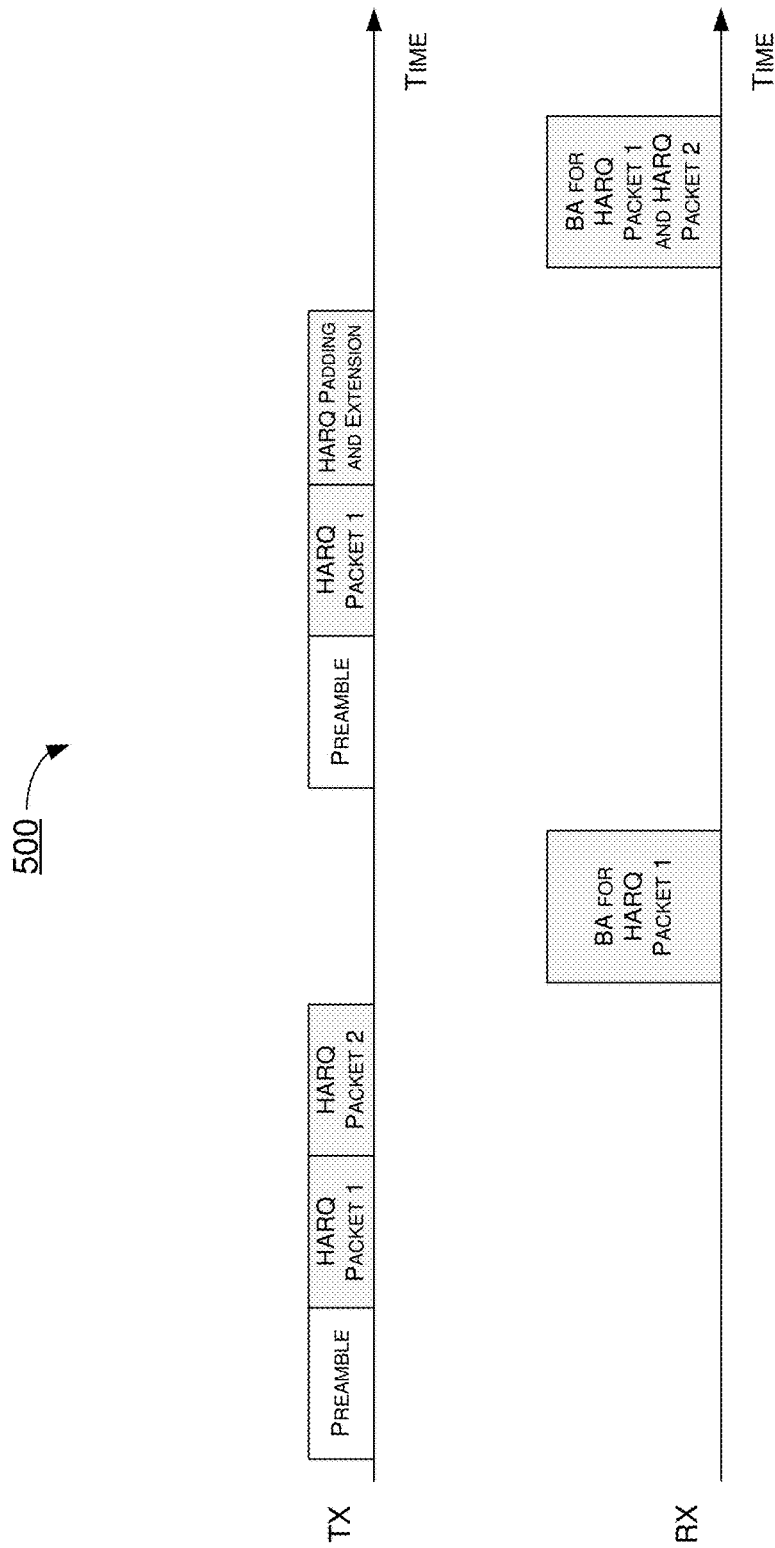
FIG. 5 is a diagram of an example scenario of delayed HARQ acknowledgement under the proposed scheme in accordance with the present disclosure.

FIG. 5 illustrates an example scenario 500 of delayed HARQ acknowledgement under the proposed scheme in accordance with the present disclosure. In scenario 500, communication entity 110 may transmit a preamble, HARQ packet 1 (hereinafter interchangeably referred to as "first HARQ packet") and HARQ packet 2 (hereinafter interchangeably referred to as "second HARQ packet") to communication entity 120. In response, communication entity 120 may transmit a BA for HARQ packet 1 indicating a need for extra retransmission(s) of HARQ packet 1. Communication entity 110 may then transmit another preamble and retransmit HARQ packet 1, along with HARQ padding and extension, to communication entity 120. In response, communication entity 120 may transmit a BA for HARQ packet 1 and HARQ packet 2 indicating that HARQ packet 1 and HARQ packet 2 have been received (and decoded) successfully.

Under the proposed scheme, with respect to delayed acknowledgement for HARQ packet operation, transmission opportunity (TXOP) responder feedback may be on both automatic repeat request (ARQ) level and HARQ coding units level. Under the proposed scheme, HARQ acknowledgement (ACK) type subfield in BA control field may indicate HARQ ACK type. Additionally, BA information subfield may indicate correctly-received MPDU(s) from ongoing HARQ packet(s). Moreover, HARQ ACK information subfield may contain acknowledgement and negative acknowledgement (ACK/NACK) of HARQ coding words/units for each ongoing HARQ packet.

Figure 6:
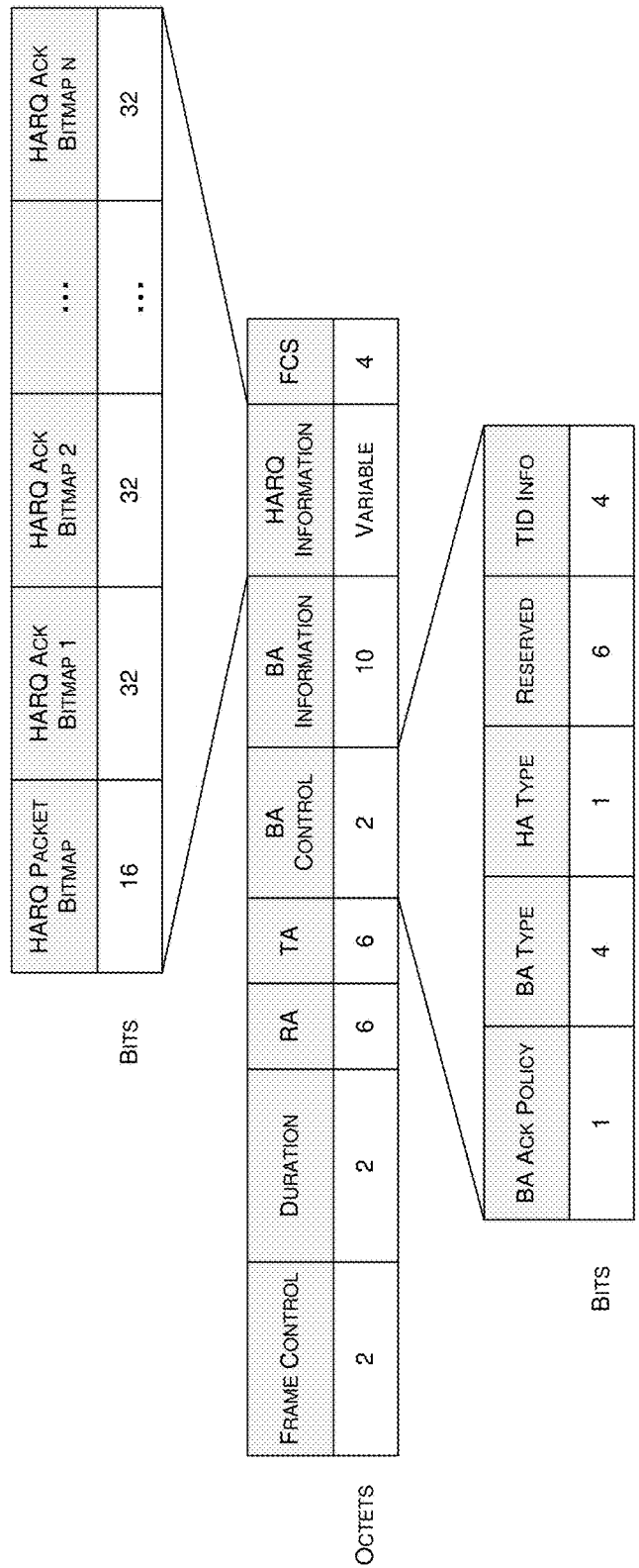
FIG. 6 is a diagram of an example scenario of delayed acknowledgement for HARQ packet operation under the proposed scheme in accordance with the present disclosure.

FIG. 6 illustrates an example scenario 600 of delayed acknowledgement for HARQ packet operation under the proposed scheme in accordance with the present disclosure. Referring to FIG. 6, a HARQ packet bitmap may indicate the index of HARQ packet of which HARQ ACK bitmap is included. As an example, 16 bits may be utilized to represent 8 HARQ packets with each packet corresponding to 2 bits. In this example, "00" may indicate early termination of the HARQ packet (fallback to ARQ). Additionally, "01" may indicate immediately HARQ ACK and a HARQ ACK bitmap may be included in the HARQ ACK information subfield. Moreover, "10" may indicate delayed HARQ ACK and the TXOP initiator may not retransmit HARQ coding words/units until receiving HARQ ACK for the corresponding HARQ packet. Furthermore, "11" may be reserved. Additionally, each HARQ ACK bitmap may indicate ACK/NACK for HARQ coding words/units of a respective HARQ packet. As an example, 32 bits may be utilized for each HARQ packet to indicate a maximum of 32 HARQ coding units for the respective HARQ packet.

Under a proposed scheme, with respect to a compressed BlockAck variant frame, the HA type subfield may be set to either 0 or 1. For instance, the HA type subfield may be set to 0 in an event that the BA information represents the received status of the ARQ operation. Moreover, the HA type subfield may be set to 1 in an event that the BA information represents the received status of the HARQ operation. Under the proposed scheme, when the HA type subfield is set to 1, a BA bitmap subfield of the BA information field of the compressed BlockAck frame may indicate the received status of HARQ operation. Specifically, each BA entry (which is a variable format) may represent a MAC Service Data Unit (MSDU) or an Aggregate MSDU (A-MSDU) in the order of sequence number, with the first BA entry of the BlockAck bitmap field corresponding to the MSDU or A-MSDU with the sequence number that matches the value of the starting sequence number subfield of the BlockAck starting sequence control subfield.

Figure 7:
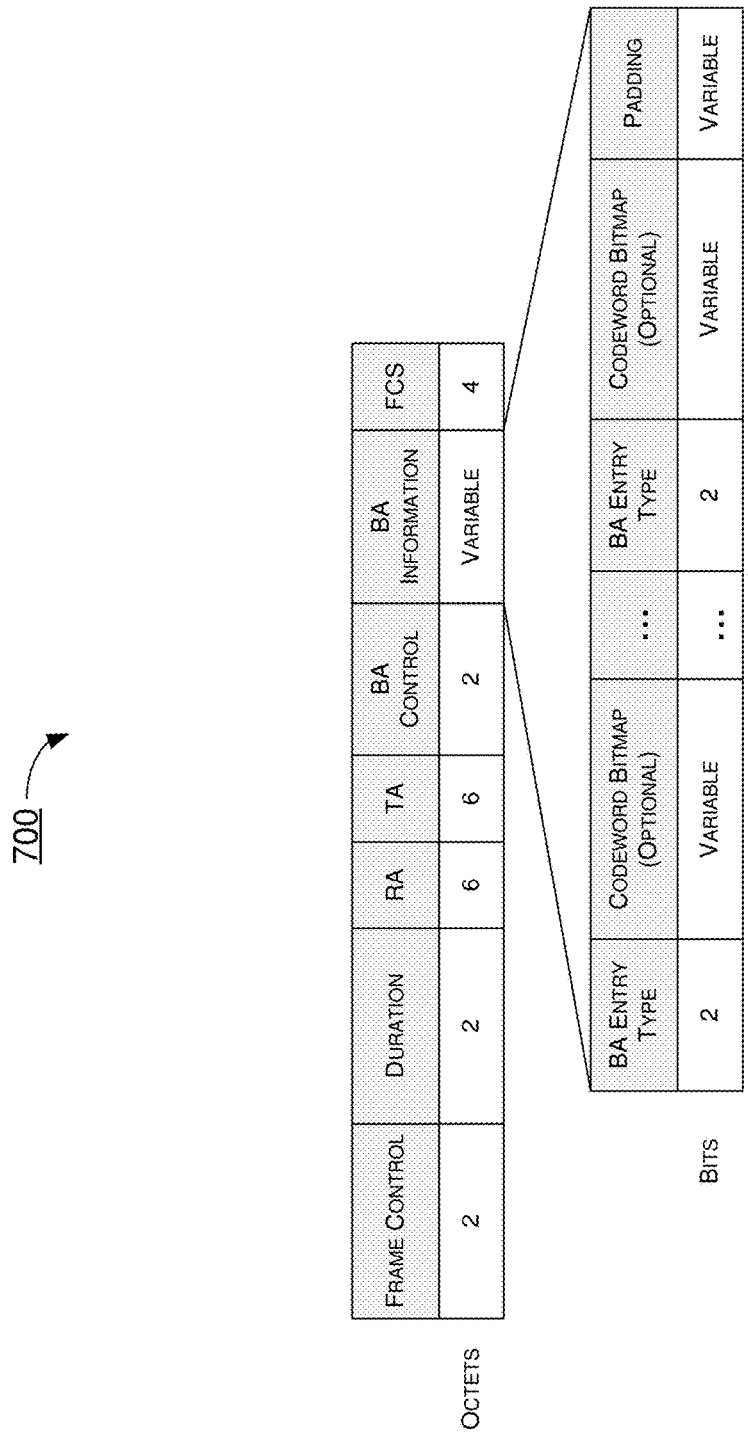
FIG. 7 is a diagram of an example scenario of HARQ variant BlockAck format under the proposed scheme in accordance with the present disclosure.

FIG. 7 illustrates an example scenario 700 of HARQ variant BlockAck format under the proposed scheme in accordance with the present disclosure. Referring to FIG. 7, when the HA type subfield is set to 1, the BA entry type of each BA entry may be set to 0 for requesting a retransmission of a single MSDU or A-MSDU. The Codeword Bitmap may not be present in the corresponding BA entry. Alternatively, the BA entry type of each BA entry may be set to 1 for indicating an acknowledgement of the successful reception of a single MSDU or A-MSDU (e.g., the corresponding MPDU or A-MSDU decoding is finished and the cyclic redundancy check (CRC) of MAC frame body is correct). The Codeword Bitmap may not be present in the corresponding BA entry. In such case, the transmitting device (e.g., communication entity 110 or communication entity 120) that receives the BA entry set to 1 may release the TX buffer of the corresponding MSDU or A-MSDU.

Under the proposed scheme, when the HA type subfield is set to 1, the BA entry type of each BA entry may be set to 2 for indicating an acknowledgement of the successful reception of all codewords of a single MSDU or A-MSDU and a pending status of the corresponding MPDU or A-MSDU decoding. The Codeword Bitmap may not be present in the corresponding BA entry. In such case, the transmitting device (e.g., communication entity 110 or communication entity 120) that receives the BA entry set to 2 may not release the TX MAC buffer of the corresponding MSDU or A-MSDU because the corresponding MSDU or A-MSDU is still not acknowledged at the MAC level. However, the transmitting device (e.g., communication entity 110 or communication entity 120) that receives the BA entry set to 2 may release the TX PHY buffer of all codewords of the corresponding MSDU or A-MSDU. Moreover, the transmitting device (e.g., communication entity 110 or communication entity 120) that receives the BA entry set to 2 may take any action for the corresponding MSDU or A-MSDU until it receives the BA entry set to either 0 or 1 for the corresponding MSDU or A-MSDU.

FIG. 8 illustrates an example scenario 800 of HARQ variant BlockAck format under the proposed scheme in accordance with the present disclosure. Referring to FIG. 8, when the HA type subfield is set to 1, the BA entry type of each BA entry may be set to 3 for requesting a retransmission of the failed codewords of a single MSDU or A-MSDU. The Codeword Bitmap may be present in the corresponding BA entry. In scenario 800, the Codeword Bitmap length may indicate the length of the Codeword Ack Bitmap (0:16 bits, 1:32 bits, 2:64 bits, 3:128 bits). Moreover, the Codeword Ack Bitmap may indicate the indexes of the failed codewords.

Illustrative Implementations

Figure 9:
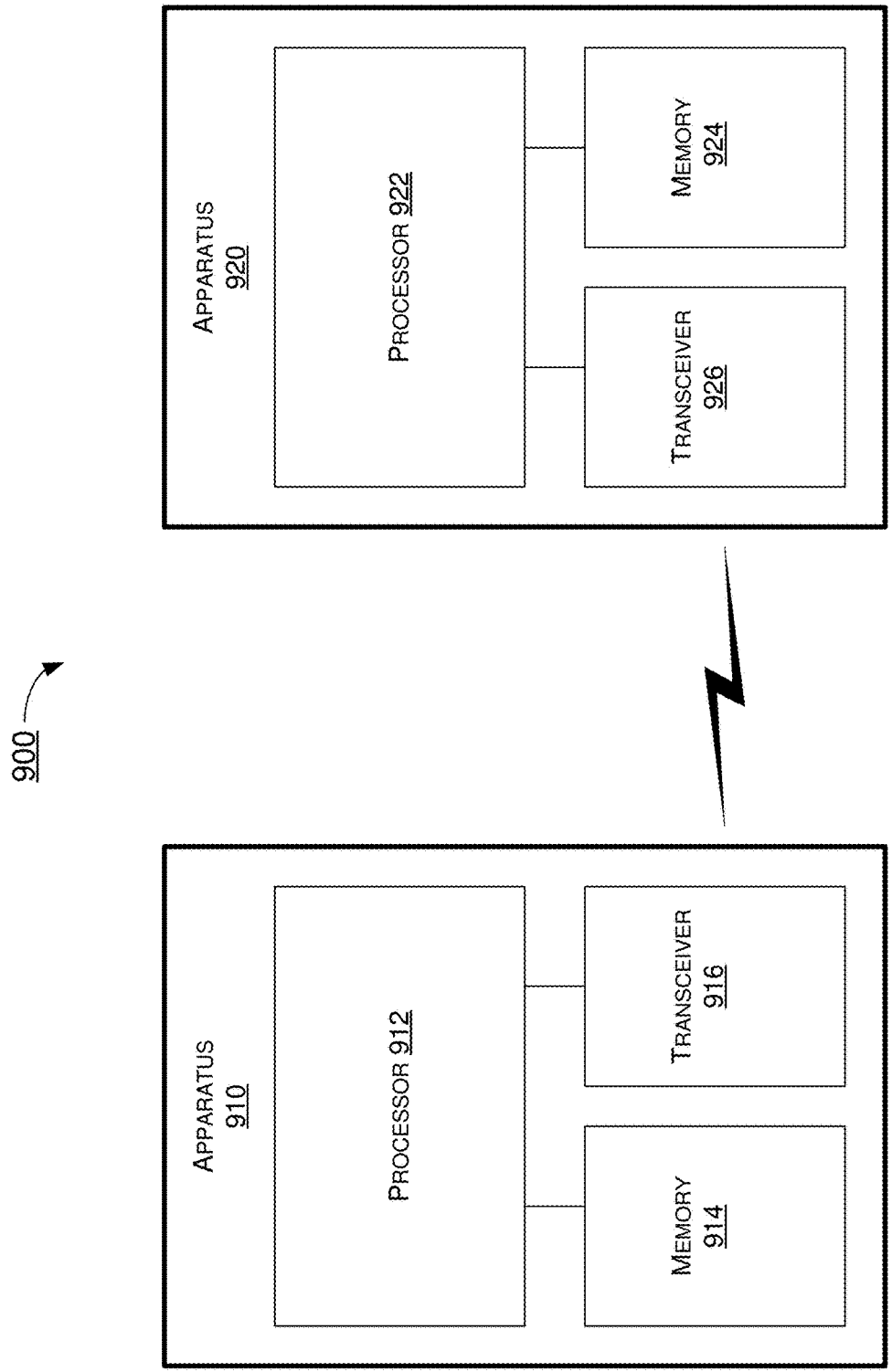
FIG. 9 is a block diagram of an example communication system in accordance with an implementation of the present disclosure.

FIG. 9 illustrates an example system 900 having at least an example apparatus 910 and an example apparatus 920 in accordance with an implementation of the present disclosure. Each of apparatus 910 and apparatus 920 may perform various functions to implement schemes, techniques, processes and methods described herein pertaining to hardware-friendly HARQ operations in WLANs, including the various schemes described above with respect to various proposed designs, concepts, schemes, systems and methods described above as well as processes described below. For instance, apparatus 910 may be an example implementation of communication entity 110, and apparatus 920 may be an example implementation of communication entity 120.

Each of apparatus 910 and apparatus 920 may be a part of an electronic apparatus, which may be a STA or an AP, such as a portable or mobile apparatus, a wearable apparatus, a wireless communication apparatus or a computing apparatus. For instance, each of apparatus 910 and apparatus 920 may be implemented in a smartphone, a smart watch, a personal digital assistant, a digital camera, or a computing equipment such as a tablet computer, a laptop computer or a notebook computer. Each of apparatus 910 and apparatus 920 may also be a part of a machine type apparatus, which may be an IoT apparatus such as an immobile or a stationary apparatus, a home apparatus, a wire communication apparatus or a computing apparatus. For instance, each of apparatus 910 and apparatus 920 may be implemented in a smart thermostat, a smart fridge, a smart door lock, a wireless speaker or a home control center. When implemented in or as a network apparatus, apparatus 910 and/or apparatus 920 may be implemented in a network node, such as an AP in a WLAN.

In some implementations, each of apparatus 910 and apparatus 920 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 910 and apparatus 920 may be implemented in or as a STA or an AP. Each of apparatus 910 and apparatus 920 may include at least some of those components shown in FIG. 9 such as a processor 912 and a processor 922, respectively, for example. Each of apparatus 910 and apparatus 920 may further include one or more other components not pertinent to the proposed scheme of the present disclosure (e.g., internal power supply, display device and/or user interface device), and, thus, such component(s) of apparatus 910 and apparatus 920 are neither shown in FIG. 9 nor described below in the interest of simplicity and brevity.

In one aspect, each of processor 912 and processor 922 may be implemented in the form of one or more single-core processors, one or more multi-core processors, one or more RISC processors or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including those pertaining to hardware-friendly HARQ operations in WLANs in accordance with various implementations of the present disclosure.

In some implementations, apparatus 910 may also include a transceiver 916 coupled to processor 912. Transceiver 916 may be capable of wirelessly transmitting and receiving data. In some implementations, apparatus 920 may also include a transceiver 926 coupled to processor 922. Transceiver 926 may include a transceiver capable of wirelessly transmitting and receiving data.

In some implementations, apparatus 910 may further include a memory 914 coupled to processor 912 and capable of being accessed by processor 912 and storing data therein. In some implementations, apparatus 920 may further include a memory 924 coupled to processor 922 and capable of being accessed by processor 922 and storing data therein. Each of memory 914 and memory 924 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 914 and memory 924 may include a type of read-only memory (ROM) such as mask ROM, programmable ROM (PROM), erasable programmable ROM (EPROM) and/or electrically erasable programmable ROM (EEPROM). Alternatively, or additionally, each of memory 914 and memory 924 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 910 and apparatus 920 may be a communication entity capable of communicating with each other using various proposed schemes in accordance with the present disclosure. For illustrative purposes and without limitation, a description of capabilities of apparatus 910, as communication entity 110, and apparatus 920, as communication entity 120, is provided below. It is noteworthy that, although the example implementations described below are provided in the context of WLAN, the same may be implemented in other types of networks. Thus, although the following description of example implementations pertains to a scenario in which apparatus 910 functions as a transmitting device and apparatus 920 functions as a receiving device, the same is also applicable to another scenario in which apparatus 910 functions as a receiving device and apparatus 920 functions as a transmitting device.

Under a proposed scheme in accordance with the present disclosure, processor 912 of apparatus 910 may generate a first HARQ packet based at least in part on one or more capabilities of apparatus 920. Moreover, processor 912 may transmit, via transceiver 916, the first HARQ packet to apparatus 920.

In some implementations, in generating the first HARQ packet based at least in part on the one or more capabilities of apparatus 920, processor 912 may generate the first HARQ packet based on at least one of: (i) one or more HARQ processing capabilities at a PHY layer of apparatus 920; (ii) one or more HARQ processing capabilities at a MAC layer of apparatus 920; (iii) one or more codewords for HARQ retransmission; (iv) one or more MPDUs for HARQ retransmission; and (v) one or more new MPDUs for initial transmission.

In some implementations, in generating the first HARQ packet, processor 912 may perform certain operations. For instance, processor 912 may select a type of HARQ and a type of HARQ padding and extension corresponding to the first HARQ packet. Additionally, processor 912 may generate the first HARQ packet with an indication of the selected type of HARQ and the selected type of HARQ padding and extension.

In some implementations, in selecting the type of HARQ and the type of HARQ padding and extension, processor 912 may select the type of HARQ and the type of HARQ padding and extension based on HARQ feedbacks and one or more HARQ capabilities of apparatus 920. In some implementations, the HARQ feedbacks may include a required amount of HARQ retransmissions as well as a number of codewords and a number of MPDUs to be retransmitted.

In some implementations, the selected type of HARQ and the selected type of HARQ padding and extension may result in apparatus 920 processing the first HARQ packet within a predetermined time constraint.

In some implementations, the type of HARQ may pertain to one of a plurality of incremental amounts of IR with respect to a punctured LDPC codeword for HARQ retransmission. In such cases, in selecting the type of HARQ, processor 912 may select the type of HARQ with an incremental amount of IR greater than required by apparatus 920. Alternatively, or additionally, the type of HARQ padding and extension may pertain to one of a plurality of lengths of time of HARQ padding and extension.

In some implementations, processor 912 may perform additional operations. For instance, processor 912 may transmit, via transceiver 916, a second HARQ packet to apparatus 920 after transmitting the first HARQ packet. Moreover, processor 912 may receive, via transceiver 916, a delayed acknowledgement from apparatus 920 after transmitting the second HARQ packet. In such cases, the delayed acknowledgement may include a BA indicating either the first HARQ packet having been received successfully or a need for retransmitting the first HARQ packet.

Under another proposed scheme in accordance with the present disclosure, processor 912 of apparatus 910 may transmit, via transceiver 916, a first HARQ packet to apparatus 920. Additionally, processor 912 may transmit, via transceiver 916, a second HARQ packet to apparatus 920 after transmitting the first HARQ packet. Moreover, processor 912 may receive, via transceiver 916, a first delayed acknowledgement from apparatus 920 after transmitting the second HARQ packet.

In some implementations, the first delayed acknowledgement may include a BA pertaining to the first HARQ packet. In such cases, processor 912 may perform additional operations. For instance, processor 912 may transmit, via transceiver 916, one or more MPDUs to apparatus 920 after receiving the first delayed acknowledgement. Moreover, processor 912 may receive, via transceiver 916, a second delayed acknowledgement from apparatus 920 after transmitting the one or more MPDUs. For instance, the BA may indicate the first HARQ packet having been received successfully. In some implementations, the second delayed acknowledgement may include one other BA pertaining to the second HARQ packet, the one or more MPDUs, or both the second HARQ packet and the one or more MPDUs.

Alternatively, in an event that the first delayed acknowledgement includes a BA pertaining to the first HARQ packet, processor 912 may perform other additional operations. For instance, processor 912 may retransmit, via transceiver 916, the first HARQ packet with HARQ padding and extension to apparatus 920 responsive to receiving the BA. Furthermore, processor 912 may receive, via transceiver 916, a second delayed acknowledgement from apparatus 920 after transmitting the one or more MPDUs. For instance, the BA may indicate a need for retransmitting the first HARQ packet. In some implementations, the second delayed acknowledgement may include one other BA pertaining to the first HARQ packet, the second HARQ packet, or both the first HARQ packet and the second HARQ packet.

In some implementations, a HARQ ACK information field in at least one of the first HARQ packet and the second HARQ packet may include a HARQ packet bitmap subfield having a plurality of bits indicating indexes of a plurality of HARQ packets of a plurality of HARQ ACK bitmaps corresponding to a plurality of HARQ packets indicated in the HARQ ACK information field.

In some implementations, processor 912 may perform additional operations. For instance, prior to transmitting each of the first HARQ packet and the second HARQ packet, processor 912 may generate each of the first HARQ packet and the second HARQ packet based at least in part on one or more capabilities of apparatus 920. In some implementations, the one or more capabilities of apparatus 920 may include at least one of: (i) one or more HARQ processing capabilities at a PHY layer of apparatus 920; (ii) one or more HARQ processing capabilities at a MAC layer of apparatus 920; (iii) one or more codewords for HARQ retransmission; (iv) one or more MPDUs for HARQ retransmission; and (v) one or more new MPDUs for initial transmission.

In some implementations, in generating each of the first HARQ packet and the second HARQ packet, for a respective HARQ packet of the first HARQ packet and the second HARQ packet, processor 912 may perform certain operations. For instance, processor 912 may select a type of HARQ and a type of HARQ padding and extension corresponding to the respective HARQ packet based on HARQ feedbacks and one or more HARQ capabilities of apparatus 920. Additionally, processor 912 may generate the respective HARQ packet with an indication of the selected type of HARQ and the selected type of HARQ padding and extension. In such cases, the HARQ feedbacks may include a required amount of HARQ retransmissions as well as a number of codewords and a number of MPDUs to be retransmitted.

Illustrative Processes

Figure 10:
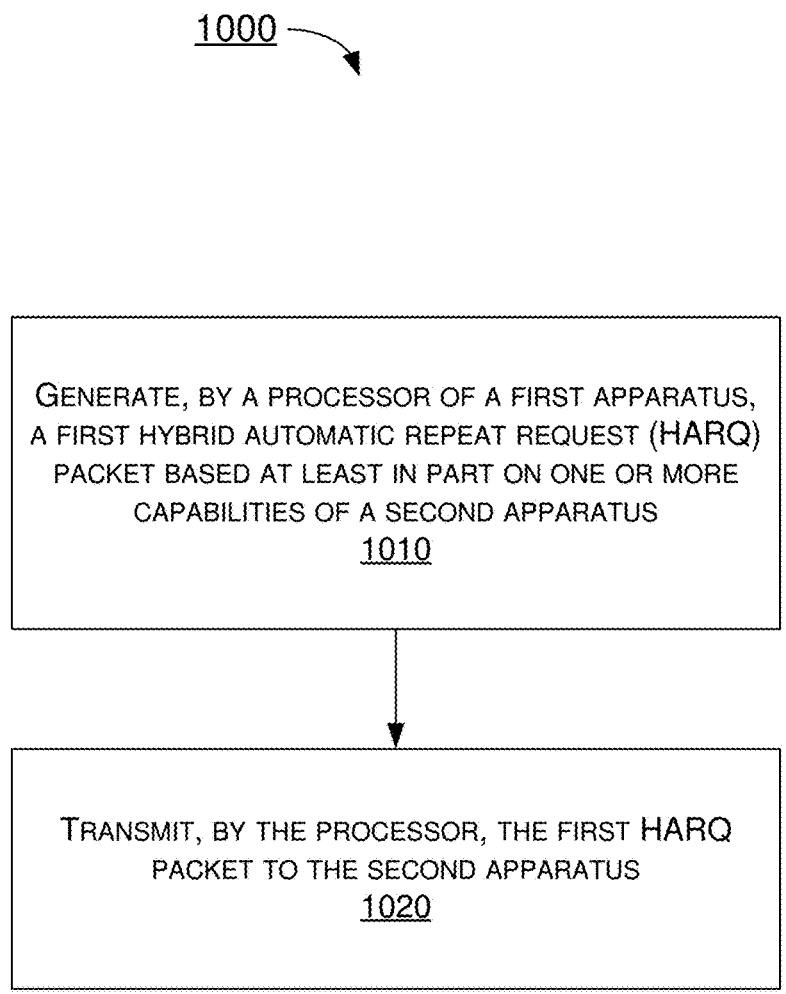
FIG. 10 is a flowchart of an example process in accordance with an implementation of the present disclosure.

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to hardware-friendly HARQ operations in WLANs in accordance with the present disclosure. Process 1000 may include one or more operations, actions, or functions as illustrated by one or more of blocks 1010 and 1020. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed repeatedly or iteratively. Process 1000 may be implemented by or in apparatus 910 and apparatus 920 as well as any variations thereof. Solely for illustrative purposes and without limiting the scope, process 1000 is described below in the context of apparatus 910 as communication entity 110 (e.g., a transmitting device whether a STA or an AP) and apparatus 920 as communication entity 120 (e.g., a receiving device whether a STA or an AP) of a wireless network such as a WLAN in accordance with one or more of IEEE 802.11 standards. Process 1000 may begin at block 1010.

At 1010, process 1000 may involve processor 912 of apparatus 910 generating a first HARQ packet based at least in part on one or more capabilities of apparatus 920. Process 1000 may proceed from 1010 to 1020.

At 1020, process 1000 may involve processor 912 transmitting, via transceiver 916, the first HARQ packet to apparatus 920.

In some implementations, in generating the first HARQ packet based at least in part on the one or more capabilities of apparatus 920, process 1000 may involve processor 912 generating the first HARQ packet based on at least one of: (i) one or more HARQ processing capabilities at a PHY layer of apparatus 920; (ii) one or more HARQ processing capabilities at a MAC layer of apparatus 920; (iii) one or more codewords for HARQ retransmission; (iv) one or more MPDUs for HARQ retransmission; and (v) one or more new MPDUs for initial transmission.

In some implementations, in generating the first HARQ packet, process 1000 may involve processor 912 performing certain operations. For instance, process 1000 may involve processor 912 selecting a type of HARQ and a type of HARQ padding and extension corresponding to the first HARQ packet. Additionally, process 1000 may involve processor 912 generating the first HARQ packet with an indication of the selected type of HARQ and the selected type of HARQ padding and extension.

In some implementations, in selecting the type of HARQ and the type of HARQ padding and extension, process 1000 may involve processor 912 selecting the type of HARQ and the type of HARQ padding and extension based on HARQ feedbacks and one or more HARQ capabilities of apparatus 920. In some implementations, the HARQ feedbacks may include one or more of the following: a required amount of HARQ retransmissions, a number of codewords and a number of MPDUs to be retransmitted.

In some implementations, the selected type of HARQ and the selected type of HARQ padding and extension may result in apparatus 920 processing the first HARQ packet within a predetermined time constraint.

In some implementations, the type of HARQ may pertain to one of a plurality of incremental amounts of IR with respect to a punctured LDPC codeword for HARQ retransmission. In such cases, in selecting the type of HARQ, process 1000 may involve processor 912 selecting the type of HARQ with an incremental amount of IR greater than required by apparatus 920. Alternatively, or additionally, the type of HARQ padding and extension may pertain to one of a plurality of lengths of time of HARQ padding and extension.

In some implementations, process 1000 may involve processor 912 performing additional operations. For instance, process 1000 may involve processor 912 transmitting, via transceiver 916, a second HARQ packet to apparatus 920 after transmitting the first HARQ packet. Moreover, process 1000 may involve processor 912 receiving, via transceiver 916, a delayed acknowledgement from apparatus 920 after transmitting the second HARQ packet. In such cases, the delayed acknowledgement may include a BA indicating either the first HARQ packet having been received successfully or a need for retransmitting the first HARQ packet.

Figure 11:
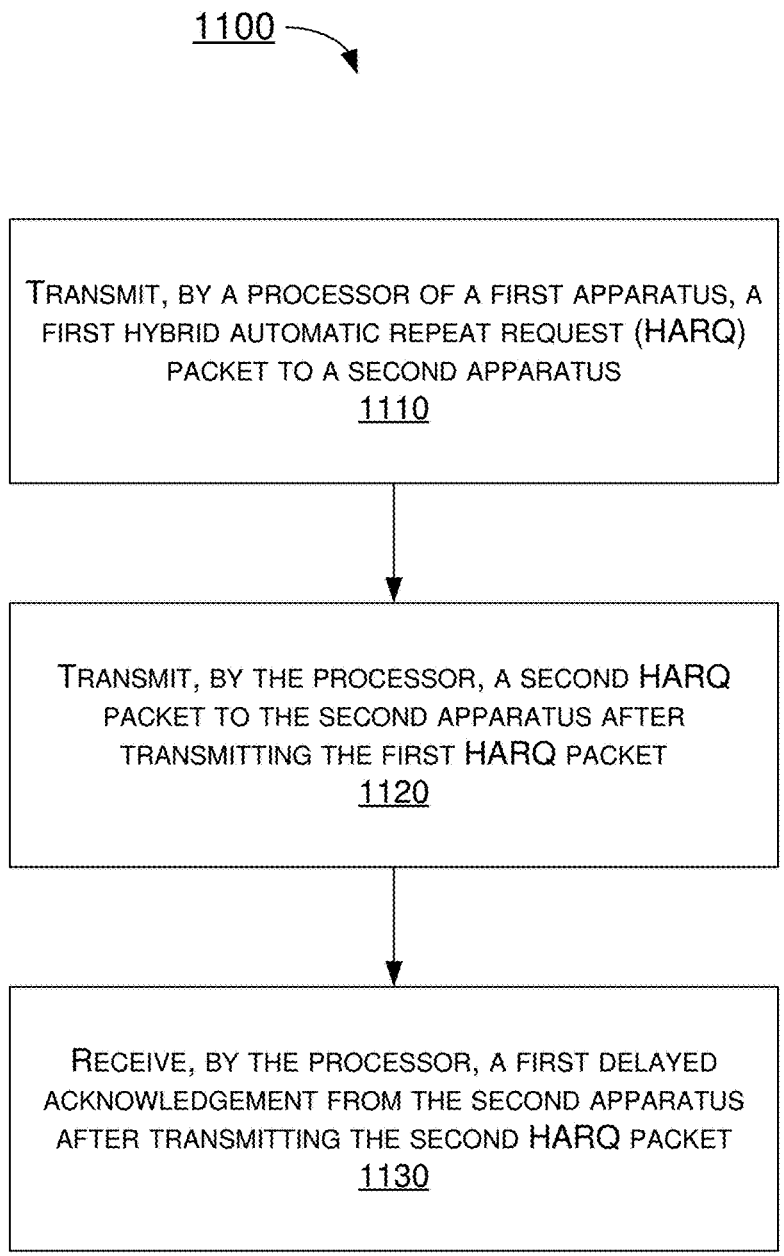
FIG. 11 is a flowchart of an example process in accordance with an implementation of the present disclosure.

FIG. 11 illustrates an example process 1100 in accordance with an implementation of the present disclosure. Process 1100 may represent an aspect of implementing various proposed designs, concepts, schemes, systems and methods described above. More specifically, process 1100 may represent an aspect of the proposed concepts and schemes pertaining to hardware-friendly HARQ operations in WLANs in accordance with the present disclosure. Process 1100 may include one or more operations, actions, or functions as illustrated by one or more of blocks 1110, 1120 and 1130. Although illustrated as discrete blocks, various blocks of process 1100 may be divided into additional blocks, combined into fewer blocks, or eliminated, depending on the desired implementation. Moreover, the blocks/sub-blocks of process 1100 may be executed in the order shown in FIG. 11 or, alternatively in a different order. Furthermore, one or more of the blocks/sub-blocks of process 1100 may be executed repeatedly or iteratively. Process 1100 may be implemented by or in apparatus 910 and apparatus 920 as well as any variations thereof. Solely for illustrative purposes and without limiting the scope, process 1100 is described below in the context of apparatus 910 as communication entity 110 (e.g., a transmitting device whether a STA or an AP) and apparatus 920 as communication entity 120 (e.g., a receiving device whether a STA or an AP) of a wireless network such as a WLAN in accordance with one or more of IEEE 802.11 standards. Process 1100 may begin at block 1110.

At 1110, process 1100 may involve processor 912 of apparatus 910 transmitting, via transceiver 916, a first HARQ packet to apparatus 920. Process 1100 may proceed from 1110 to 1120.

At 1120, process 1100 may involve processor 912 transmitting, via transceiver 916, a second HARQ packet to apparatus 920 after transmitting the first HARQ packet. Process 1100 may proceed from 1120 to 1130.

At 1130, process 1100 may involve processor 912 receiving, via transceiver 916, a first delayed acknowledgement from apparatus 920 after transmitting the second HARQ packet.

In some implementations, the first delayed acknowledgement may include a BA pertaining to the first HARQ packet. In such cases, process 1100 may involve processor 912 performing additional operations. For instance, process 1100 may involve processor 912 transmitting, via transceiver 916, one or more MPDUs to apparatus 920 after receiving the first delayed acknowledgement. Moreover, process 1100 may involve processor 912 receiving, via transceiver 916, a second delayed acknowledgement from apparatus 920 after transmitting the one or more MPDUs. For instance, the BA may indicate the first HARQ packet having been received successfully. In some implementations, the second delayed acknowledgement may include one other BA pertaining to the second HARQ packet, the one or more MPDUs, or both the second HARQ packet and the one or more MPDUs.

Alternatively, in an event that the first delayed acknowledgement includes a BA pertaining to the first HARQ packet, process 1100 may involve processor 912 performing other additional operations. For instance, process 1100 may involve processor 912 retransmitting, via transceiver 916, the first HARQ packet with HARQ padding and extension to apparatus 920 responsive to receiving the BA. Furthermore, process 1100 may involve processor 912 receiving, via transceiver 916, a second delayed acknowledgement from apparatus 920 after transmitting the one or more MPDUs. For instance, the BA may indicate a need for retransmitting the first HARQ packet. In some implementations, the second delayed acknowledgement may include one other BA pertaining to the first HARQ packet, the second HARQ packet, or both the first HARQ packet and the second HARQ packet.

In some implementations, a HARQ ACK information field in at least one of the first HARQ packet and the second HARQ packet may include a HARQ packet bitmap subfield having a plurality of bits indicating indexes of a plurality of HARQ packets of a plurality of HARQ ACK bitmaps corresponding to a plurality of HARQ packets indicated in the HARQ ACK information field.

In some implementations, process 1100 may involve processor 912 performing additional operations. For instance, prior to transmitting each of the first HARQ packet and the second HARQ packet, process 1100 may involve processor 912 generating each of the first HARQ packet and the second HARQ packet based at least in part on one or more capabilities of apparatus 920. In some implementations, the one or more capabilities of apparatus 920 may include at least one of: (i) one or more HARQ processing capabilities at a PHY layer of apparatus 920; (ii) one or more HARQ processing capabilities at a MAC layer of apparatus 920; (iii) one or more codewords for HARQ retransmission; (iv) one or more MPDUs for HARQ retransmission; and (v) one or more new MPDUs for initial transmission.

In some implementations, in generating each of the first HARQ packet and the second HARQ packet, for a respective HARQ packet of the first HARQ packet and the second HARQ packet, process 1100 may involve processor 912 performing certain operations. For instance, process 1100 may involve processor 912 selecting a type of HARQ and a type of HARQ padding and extension corresponding to the respective HARQ packet based on HARQ feedbacks and one or more HARQ capabilities of apparatus 920. Additionally, process 1100 may involve processor 912 generating the respective HARQ packet with an indication of the selected type of HARQ and the selected type of HARQ padding and extension. In such cases, the HARQ feedbacks may include one or more of the following: a required amount of HARQ retransmissions, a number of codewords and a number of MPDUs to be retransmitted.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    generating, by a processor of a first apparatus, a first hybrid automatic repeat request (HARQ) packet based at least in part on one or more capabilities of a second apparatus;
    transmitting, by the processor, the first HARQ packet to the second apparatus; and
    receiving, by the processor, an acknowledgement from the second apparatus responsive to transmitting the first HARQ packet,
    wherein the generating of the first HARQ packet comprises selecting a type of HARQ and a level of HARQ padding and extension based on HARQ feedbacks and one or more HARQ capabilities of the second apparatus by:
        selecting the type of HARQ from a plurality of HARQ incremental amounts each being in terms of a percentage of a codeword; and
        selecting the level of HARQ padding and extension from a plurality of HARQ padding and extension lengths each being in terms of an amount of time.

2. The method of claim 1, wherein the generating of the first HARQ packet based at least in part on the one or more capabilities of the second apparatus further comprises generating the first HARQ packet based on at least one of:
    one or more HARQ processing capabilities at a physical (PHY) layer of the second apparatus;
    one or more HARQ processing capabilities at a MAC layer of the second apparatus;
    one or more codewords for HARQ retransmission; and
    one or more new MPDUs for initial transmission.

3. The method of claim 1, wherein the generating of the first HARQ packet further comprises:
    generating the first HARQ packet with an indication of the selected type of HARQ and the selected type of HARQ padding and extension.

4. The method of claim 3, wherein the selecting of the type of HARQ and the type of HARQ padding and extension comprises selecting the type of HARQ and the type of HARQ padding and extension based on the HARQ feedbacks and the one or more HARQ capabilities of the second apparatus.

5. The method of claim 4, wherein the HARQ feedbacks comprise a required amount of HARQ retransmissions, a number of codewords, a number of medium access control (MAC) protocol data units (MPDUs) to be retransmitted, or a combination thereof.

6. The method of claim 3, wherein the selected type of HARQ and the selected type of HARQ padding and extension result in the second apparatus processing the first HARQ packet within a predetermined time constraint.

7. The method of claim 3, wherein the type of HARQ pertains to one of a plurality of incremental amounts of incremental redundancy (IR) with respect to a punctured low-density parity-check (LDPC) codeword for HARQ retransmission.

8. The method of claim 7, wherein the selecting of the type of HARQ comprises selecting the type of HARQ with an incremental amount of IR greater than required by the second apparatus.

9. The method of claim 1, further comprising:
    transmitting, by the processor, a second HARQ packet to the second apparatus after transmitting the first HARQ packet; and
    receiving, by the processor, a delayed acknowledgement from the second apparatus after transmitting the second HARQ packet,
    wherein the delayed acknowledgement comprises a block acknowledgement (BA) indicating either the first HARQ packet having been received successfully or a need for retransmitting the first HARQ packet.

10. A method, comprising:
    generating, by a processor of a first apparatus, a first hybrid automatic repeat request (HARQ) packet and a second HARQ packet based at least in part on one or more capabilities of a second apparatus;
    transmitting, by the processor, the first HARQ packet to the second apparatus;
    transmitting, by the processor, the second HARQ packet to the second apparatus after transmitting the first HARQ packet; and
    receiving, by the processor, a first delayed acknowledgement from the second apparatus after transmitting the second HARQ packet,
    wherein the generating of the first HARQ packet comprises selecting a type of HARQ and a level of HARQ padding and extension based on HARQ feedbacks and one or more HARQ capabilities of the second apparatus by:
        selecting the type of HARQ from a plurality of HARQ incremental amounts each being in terms of a percentage of a codeword; and
        selecting the level of HARQ padding and extension from a plurality of HARQ padding and extension lengths each being in terms of an amount of time.

11. The method of claim 10, wherein the first delayed acknowledgement comprises a block acknowledgement (BA) pertaining to the first HARQ packet.

12. The method of claim 11, further comprising:
    transmitting, by the processor, one or more other MPDUs to the second apparatus after receiving the first delayed acknowledgement; and
    receiving, by the processor, a second delayed acknowledgement from the second apparatus after transmitting the one or more other MPDUs, wherein the BA indicates the first HARQ packet having been received successfully.

13. The method of claim 12, wherein the second delayed acknowledgement comprises one other BA pertaining to the second HARQ packet, the one or more MPDUs, or both the second HARQ packet and the one or more MPDUs.

14. The method of claim 11, further comprising:
retransmitting, by the processor, the first HARQ packet with HARQ padding and extension to the second apparatus responsive to receiving the BA; and
receiving, by the processor, a second delayed acknowledgement from the second apparatus after transmitting the one or more MPDUs,
wherein the BA indicates a need for retransmitting the first HARQ packet.

15. The method of claim 14, wherein the second delayed acknowledgement comprises one other BA pertaining to the first HARQ packet, the second HARQ packet, or both the first HARQ packet and the second HARQ packet.

16. The method of claim 10, wherein a HARQ acknowledgement (ACK) information field in at least one of the first HARQ packet and the second HARQ packet comprises a HARQ packet bitmap subfield having a plurality of bits indicating indexes of a plurality of HARQ packets of a plurality of HARQ ACK bitmaps corresponding to a plurality of HARQ packets indicated in the HARQ ACK information field.

17. The method of claim 10, wherein the one or more capabilities of the second apparatus further comprise at least one of:
one or more HARQ processing capabilities at a physical (PHY) layer of the second apparatus;
one or more HARQ processing capabilities at a medium access control (MAC) layer of the second apparatus;
one or more codewords for HARQ retransmission; and
one or more new MPDUs for initial transmission.

18. The method of claim 10, wherein the generating of each of the first HARQ packet and the second HARQ packet comprises:
for a respective HARQ packet of the first HARQ packet and the second HARQ packet:
generating the respective HARQ packet with an indication of the selected type of HARQ and the selected type of HARQ padding and extension,
wherein the HARQ feedbacks comprise a required amount of HARQ retransmissions, a number of codewords, a number of medium access control (MAC) protocol data units (MPDUs) to be retransmitted, or a combination thereof.

19. An apparatus, comprising:
a transceiver configured to communicate wirelessly; and
a processor coupled to the transceiver and configured to perform operations comprising:
generating a first hybrid automatic repeat request (HARQ) packet based at least in part on one or more capabilities of one other apparatus;
transmitting, via the transceiver, the first HARQ packet to the other apparatus; and
receiving, via the transceiver, an acknowledgement from the other apparatus responsive to transmitting the first HARQ packet,
wherein the generating of the first HARQ packet comprises selecting a type of HARQ and a level of HARQ padding and extension based on HARQ feedbacks and one or more HARQ capabilities of the second apparatus by:
selecting the type of HARQ from a plurality of HARQ incremental amounts each being in terms of a percentage of a codeword; and
selecting the level of HARQ padding and extension from a plurality of HARQ padding and extension lengths each being in terms of an amount of time.

\* \* \* \* \*